United States Patent [19]
Barr

[11] Patent Number: 5,490,705
[45] Date of Patent: Feb. 13, 1996

[54] APPARATUS FOR CONFIGURING MULTIPLE COMPARTMENTS

[76] Inventor: Christopher P. Barr, 3008 Northtown Pl., Midland, Tex. 79705

[21] Appl. No.: 280,735

[22] Filed: Jul. 26, 1994

[51] Int. Cl.6 .............................. B60P 3/04; B62D 33/04
[52] U.S. Cl. .............................................. 296/24.2; 119/11
[58] Field of Search .................................. 296/24.1, 24.2, 296/27; 119/7, 8, 11, 14; 410/129, 130

[56] References Cited

U.S. PATENT DOCUMENTS

| | | | |
|---|---|---|---|
| 1,825,452 | 9/1931 | Harris | 119/11 X |
| 4,168,933 | 9/1979 | Kane | 296/24.2 X |
| 4,339,147 | 7/1982 | Kimzey | 296/24.2 |
| 4,809,644 | 3/1989 | Wells, Jr. | 119/7 |
| 4,958,594 | 9/1990 | Swagerty | 296/24.2 X |

Primary Examiner—Dean Kramer
Attorney, Agent, or Firm—Herbert J. Hammond

[57] ABSTRACT

An apparatus for configuring multiple compartments within a standard horse trailer alternately provides a traditional tacking compartment when a horse is loaded in the trailer or a large privacy compartment for changing attire or other activities requiring privacy. The apparatus includes a slidable wall and a pivoting upper portion, both of which can be moved and secured in a number of positions relative to each other and to the trailer depending upon the function desired.

12 Claims, 2 Drawing Sheets

APPARATUS FOR CONFIGURING MULTIPLE COMPARTMENTS

TECHNICAL FIELD

The present invention relates to an apparatus for configuring compartments, and more specifically, to an apparatus for configuring multiple compartments within a standard horse trailer.

BACKGROUND OF THE INVENTION

Horse trailers include space in which one or more horses are enclosed during transportation. Most trailers include wide doors in their rear to allow horses to be easily loaded into the trailer. As the horse is loaded, it is brought forward to a point in the trailer just aft of the front wall of the trailer. A "chest bar" is used to position the horse in the trailer. As the name suggests, as the horse is loaded from the rear of the trailer and brought forward its chest will contact this chest bar, precluding further forward motion of the horse. The chest bar is located such that it stops the horse at a point where its head will have sufficient room to extend 2–3 feet beyond the chest bar and not contact the front wall of the trailer.

The empty space horizontally between the chest bar and the front wall of the trailer and vertically below the head and neck of the loaded horse has traditionally been used to store the tack. "Tack" is a term used in the horse training and riding industry to denote the equipment used in connection with horses such as bridles, bits, reins, grooming tools, blankets, etc. Compartments for such storage are known in the art. These compartments are typically boxes which define the above-identified empty space and include a door or doors for access thereto. However, the use of a permanent tack compartment in this area precludes the use of the area for other purposes when tack storage is not desired.

An additional desired purpose of a horse trailer is to provide an enclosed space for handlers, trainers and the like to change attire and/or carry out other activities requiring privacy. Horse trailers including a permanent, separate changing room forward of the horse for these purposes are known in the art. However, the existence of a completely separate and permanent changing room within a trailer adds not only substantial weight to the trailer, it also greatly increases its cost, effectively precluding their practical use.

Thus a need has arisen for an apparatus which is capable of configuring multiple compartments within a horse trailer to alternately provide a compartment for storage of equipment or a privacy enclosure, as needed.

SUMMARY OF THE INVENTION

The present invention overcomes the foregoing and other problems associated with the prior art by providing an apparatus for configuring multiple compartments within a standard horse trailer alternately providing storage space for tack when a horse is loaded into a trailer or a large enclosure for changing and other activities requiring privacy, when desired.

The present invention apparatus for configuring multiple compartments includes a wall having a lower portion and an upper portion. The upper portion is connected to the lower portion of the wall with hinges such that the upper portion can be pivoted in relation to the lower portion of the wall. The lower portion extends across the width of the trailer at a height of approximately 50 inches. Tracks including ball bearings along the side of the trailer compartment carry the weight of the wall and allow longitudinal movement of the wall within the trailer. At its lower edge, wheels contact slide rails on the floor of the trailer, facilitating longitudinal movement of the wall within the trailer compartment between a forward and a rearward position.

When a storage area for tack, etc., is desired, the wall is secured in its most forward position and the upper portion is secured in a horizontal position, defining a compartment to fill the space forward of a loaded horse and below the head and neck of the horse. Doors within the sidewalls of trailer provide convenient access to the tack being stored.

When desired, the upper portion of the wall is unsecured, raised to a vertical position aligned with the lower portion of the wall, and re-secured into this vertical position. The forward edge of the upper portion is shaped such that, in its vertical position, it substantially conforms to the roof of the trailer compartment without contacting the sidewalls or roof of the trailer. Next, the wall is unsecured and moved along the tracks and floor rails to its rearward position. This position is approximately 5 feet aft of the front wall of the trailer. Once the wall is re-secured, a large, floor-to-ceiling, private compartment is defined at the front of the trailer. Trainers, handlers and riders can use the large compartment to change attire or perform other activities requiring privacy.

When the tacking compartment is again desired, the wall can be brought to its forward position and the upper portion lowered to its horizontal position to again provide a tack storage compartment and space for horses within the trailer.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE DRAWINGS

Figure 1:
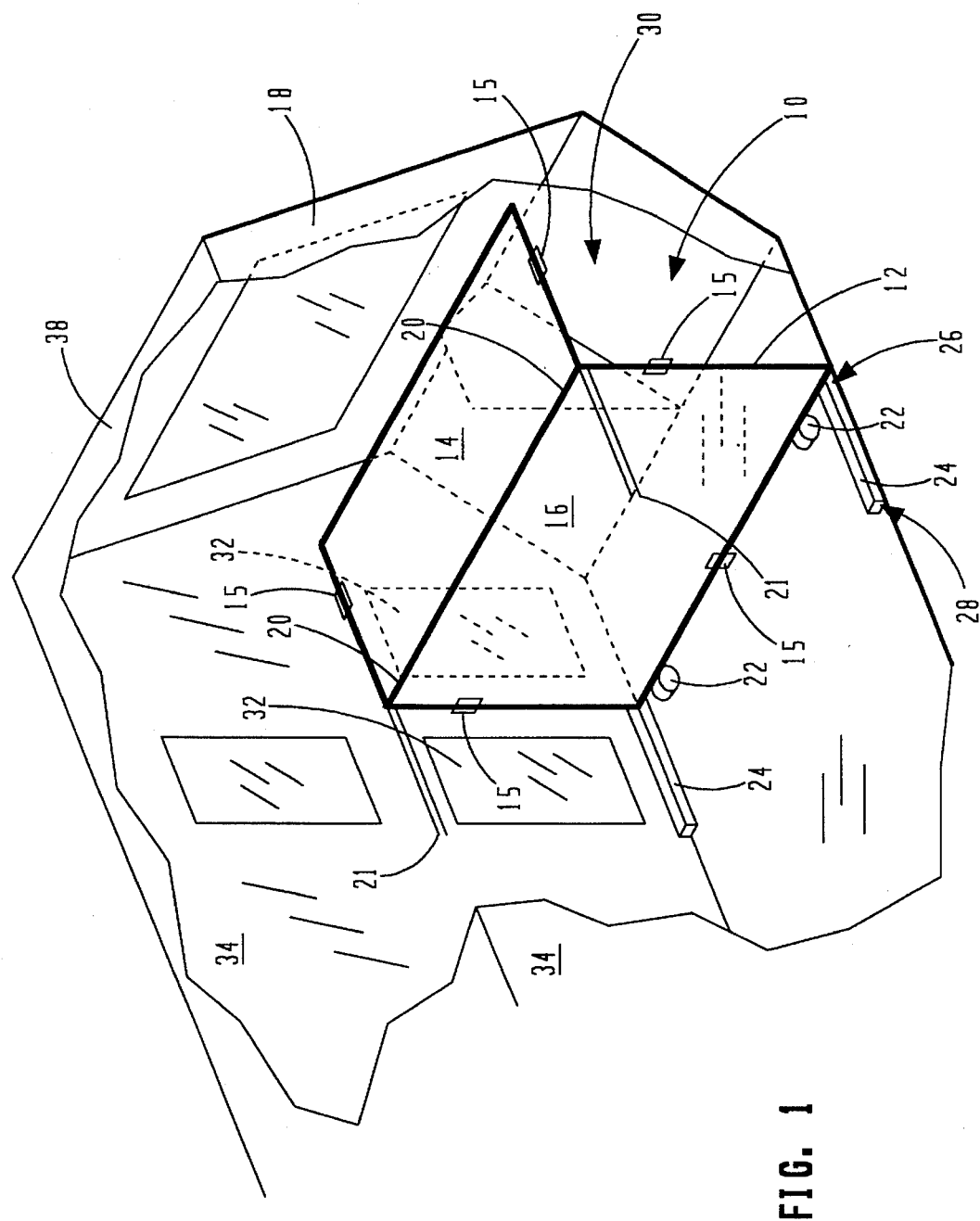
FIG. 1 is a section view of a horse trailer illustrating the tacking compartment configured by the compartment configuring apparatus of the present invention.

Referring now to FIG. 1, there is shown one embodiment of the apparatus for configuring multiple compartments of the present invention. The apparatus 10 includes a wall 12 having an upper portion 14 and a lower portion 16. The lower portion 16 of the wall is approximately 50 inches in height and substantially covers the width of the trailer 18. The upper portion 14 is connected at one end to the lower portion 16 via hinges 20, allowing the upper portion 14 to pivot with respect to the lower portion 16.

The wall rests within a track or tracks 21 along each of the side walls of the trailer 18. Ball bearings (not show) within the tracks 21 facilitate movement of the wall 12 along the tracks 21. Wheels 22, attached to the lower edges of the lower portion 16, facilitate longitudinal movement of the wall 12 along floor rails 24 of the trailer 18. The lower portion 16 can be secured into a plurality of positions along the tracks 21 and floor rails 24 between a forward position 26 and a rearward position 28. Although the mechanism for movement along the floor of the trailer is illustrated as tracks, including ball bearings and rails within which wheels slide or roll, any suitable mechanism for allowing the wall to be easily positioned at a plurality of locations within the trailer could be utilized, if desired.

The lower portion 16 and upper portion 14 of the wall 12 can be secured into a position via any suitable locking mechanism, 15 such as hinge locks, slide locks or spring-pin locks. Additionally, the lower portion 16 and upper portion 14 can be further secured in a particular position with the use of rest bars (not shown) upon or against which either portion can rest.

The apparatus 10 is capable of at least two different configurations. FIG. 1 illustrates the apparatus 10 in its tacking compartment configuration 30. In this configuration, the lower portion 16 is secured in its most forward position 26 along the tracks 21 and floor rails 24. The upper portion 14 is secured into a horizontal position, forming the tack compartment 30 in the space forward of a loaded horse (not shown) and below the head and neck of the horse. Doors 32 within the side walls 34 of the trailer 18 allow convenient access to the tacking compartment 30.

Figure 2:
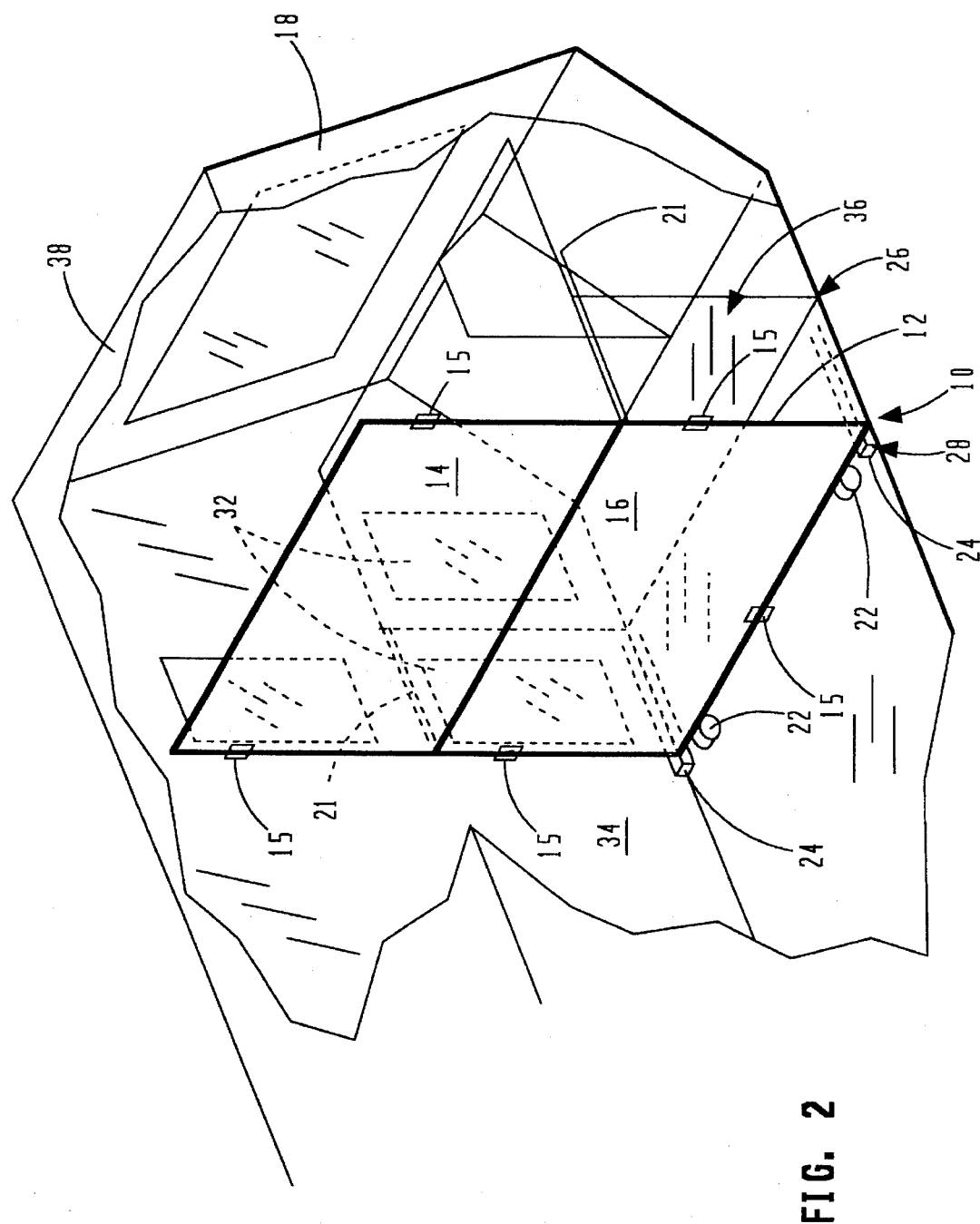
FIG. 2 is a section view of a horse trailer illustrating the privacy compartment configured by the compartment configuring apparatus of the present invention.

As illustrated in FIG. 2, when desired, the apparatus 10 can be configured to form a privacy compartment 36. To accomplish this, the upper portion 14 is unsecured, raised and re-secured into a vertical position in line with the lower portion 16. The lower portion 16 of the wall 12 is then unsecured from its forward position 26 and moved along the tracks 21 and floor rails 24 to a rearward position 28, where it is re-secured. With the wall 12 in its most rearward position 28, there is provided a privacy compartment 36 within the trailer 18. This privacy compartment 36 can be used by riders, trainers and handlers to change attire, etc. The upper portion 14 is shaped such that, when in a vertical position, the forward edge of the upper portion 14 substantially conforms to the shape of the roof 38 of the trailer 18, providing substantial privacy for the compartment 36. As with the tacking compartment 30, the privacy compartment 36 is accessed through doors 32 located within the side wall of the trailer 18.

The upper portion 14 and lower portion 16 of the wall 12 should be constructed of a light-weight, durable material which is easily cleaned with soap and water. Examples of such suitable materials include fiberglass or painted fiberboard, plastics or resins.

Although a preferred embodiment of the invention has been illustrated in the accompanying drawings and described in the foregoing Detailed Description, it will be understood that the invention is not limited to the embodiment disclosed, but is capable of numerous rearrangements and modifications of parts and elements without departing from the spirit of the invention.

I claim:

1. In a horse trailer having a floor, two side walls and a roof, apparatus for selectively configuring the trailer to define a tacking compartment or a privacy compartment for a horseman, comprising:

a wall slidably disposed substantially perpendicular to the side walls, capable of being selectively secured in a forward and rearward position;

said wall having upper and lower portions divided by a laterally extending hinge, the upper portion being pivotable about the lower portion;

said wall providing clearance for the head and neck of the horse and defining a tacking compartment when disposed in said forward position and when the upper portion thereof is disposed in a substantially horizontal position; and said wall defining a privacy compartment to provide substantially complete privacy to an adult horseman from the rear of the trailer when said wall is disposed in said rearward position and the upper portion is disposed in a substantially vertical position.

2. The apparatus of claim 1, wherein the wall and upper portion are secured into a selected position with locks.

3. The apparatus of claim 1, wherein the wall and the upper portion are constructed of fiberglass.

4. The apparatus of claim 1, wherein the wall and the upper portion are constructed of fiberboard.

5. The apparatus of claim 1, wherein the wall and the upper portion are constructed of plastic.

6. The apparatus of claim 1, wherein the wall and the upper portion are constructed of resin.

7. An apparatus for configuring multiple compartments within a horse trailer having a floor, two side walls and a roof, comprising:

a wall slidably mounted within the trailer between the two side walls and capable of configuring multiple compartments when moved longitudinally along the floor of the trailer;

said wall capable of being secured in a plurality of positions between a torward position and a rearward position and including:

an upper portion, having a forward edge, pivotally connected to the wall and capable of being secured in a substantially horizontal position and a substantially vertical position, wherein the forward edge of the upper portion is shaped to conform to the roof of the trailer when the upper portion is in a substantially vertical position;

said wall defining a tacking compartment when the upper portion is in the substantially horizontal position and the wall is in the forward position; and said wall defining a privacy compartment when the upper portion is in the substantially vertical position and the wall is in the rearward position.

8. An apparatus for configuring multiple compartments within a horse trailer having a floor, two side walls and a roof, comprising:

a wall slidably mounted within the trailer between the two side walls and capable of configuring multiple compartments when moved longitudinally along the floor of the trailer;

said wall capable of being secured in a plurality of positions between a forward position and a rearward position and including:

an upper portion pivotally connected to the wall and capable of being secured in a substantially horizontal position and a substantially vertical position, wherein the wall moves longitudinally along the floor of the trailer on wheels mounted within floor rails;

said wall defining a tacking compartment when the upper portion is in the substantially horizontal .position and the wall is in the forward position; and said wall defining a privacy compartment when the upper portion is in the substantially vertical position and the wall is in the rearward position;

9. An apparatus for configuring multiple compartments within a horse trailer having a floor, two side walls and a roof, comprising:

a wall slidably mounted within the trailer between the two side walls and capable of configuring multiple compartments when moved longitudinally along the floor of the trailer;

said wall capable of being secured in a plurality of positions between a forward position and a rearward position and including:

an upper portion pivotally connected to the wall and capable of being secured in a substantially horizontal position and a substantially vertical position;

said upper portion having a forward edge shaped to substantially conform to the roof of the trailer when the upper portion is in a substantially vertical position;

said wall defining a tacking compartment when the upper portion is in the substantially horizontal position and the wall is in the forward position; and said wall defining a privacy compartment when the upper portion is in the substantially vertical position and the wall is in the rearward position.

10. The apparatus of claim 9, wherein the wall moves longitudinally along the floor of trailer on wheels mounted within floor rails.

11. The apparatus of claim 9 further including means for facilitating longitudinal movement of the wall.

12. The apparatus of claim 11, wherein the means for facilitating longitudinal movement of the wall includes:

at least one track mounted to the side walls of the trailer and supporting the wall; and at least one floor rail for guiding longitudinal movement of the lower portion of the wall.

* * * * *

UNITED STATES PATENT AND TRADEMARK OFFICE
CERTIFICATE OF CORRECTION

PATENT NO. : 5,490,705
DATED : February 13, 1996
INVENTOR(S) : Christopher P. Barr It is certified that error appears in the above-indentified patent and that said Letters Patent is hereby corrected as shown below:

Col. 4, line 23, change "torward" to --forward--.

Signed and Sealed this

Second Day of July, 1996

Attest:

BRUCE LEHMAN

*Attesting Officer*   *Commissioner of Patents and Trademarks*